United States Patent [19]
Simpson

[11] 3,929,390
[45] Dec. 30, 1975

[54] DAMPER SYSTEM FOR SUSPENSION SYSTEMS

[75] Inventor: Paul A. Simpson, Brookline, Mass.

[73] Assignee: Cambridge Thermionic Corporation, Cambridge, Mass.

[22] Filed: Dec. 22, 1971

[21] Appl. No.: 211,030

[52] U.S. Cl. .................................................. 308/10
[51] Int. Cl.² ........................................ F16C 39/06
[58] Field of Search ............... 310/93, 105; 308/10; 188/1 B; 148/31.57

[56] References Cited
UNITED STATES PATENTS

| | | | |
|---|---|---|---|
| 2,636,139 | 4/1953 | Winget | 310/105 |
| 3,223,867 | 12/1965 | Shapiro | 310/268 X |
| 3,243,238 | 3/1966 | Lyman | 308/10 |
| 3,393,334 | 7/1968 | Sundström | 310/93 |
| 3,413,550 | 11/1968 | Wright | 310/93 X |
| 3,473,852 | 10/1969 | Lyman | 308/10 |
| 3,540,945 | 11/1970 | Strnat et al. | 148/31.57 |

*Primary Examiner*—Donovan F. Duggan
*Attorney, Agent, or Firm*—Roger Norman Coe; Thomas M. Ferrill, Jr.

[57] ABSTRACT

A system is disclosed for damping bearing systems and particularly for damping magnetic bearings by applying a conductive plate in close proximity to a strong magnetic field at one or both ends of the bearing system. Induced eddy currents in the conductive block oppose radial and axial vibrations which cause soft bearings, such as magnetic bearings, to malfunction and become dangerous at high rotational speeds.

2 Claims, 3 Drawing Figures

DAMPER SYSTEM FOR SUSPENSION SYSTEMS

FIELD OF THE INVENTION

The present invention relates to bearing systems and, more particularly, it is concerned with the damping of soft bearing systems such as magnetic bearings in such a manner as to attenuate radial and axial vibrations.

BACKGROUND OF THE INVENTION

Magnetic suspension of an object without fluid flotation means has been achieved using a pair of electromagnets exerting radial centering forces and opposed axial pulling forces by variably energizing the magnets according to the relative ratio of movement and displacement of the object. An example of such a magnetic suspension system is described in Lyman patent, U.S. Pat. No. 3,473,852. In accordance with that system, a movable body is suspended by use of a pair of electromagnet force appliers. These force appliers are controlled by stable amplifier means which are mainly responsive to velocity of movement of the body and secondarily responsive to the displacement of the body from a predetermined position between the force appliers. In such a system, each electromagnet is composed of an armature and a reentrant cup type stator which has a coil lining inserted therein. The inner and outer pole faces of the stator and armature are substantially coplanar and are configured with confronting circular projections or ridges to produce substantial radial force components in response to, and for overcoming, slight departures from coaxial alignment between the electromagnets and their armatures.

In working with "soft" bearing systems, such as magnetic suspension systems, the problem of radial and axial vibration is always encountered during rotation. In soft bearing systems such vibration can be very troublesome and more often than not will ultimately cause the bearing system to malfunction. At the present time, radial vibration is normally reduced by carefully balancing a rotor initially. However, at high rotational speeds even the smallest vibration can cause a malfunction which, unless corrected promptly, can be dangerous. Accordingly, damper systems have been developed to compensate for the vibrations occurring during rotation. Conventional dampers have been relatively large and are usually liquid filled with several moving parts. There has been a desire in the art of finding a way of reducing the size, weight and complexity of such compensating or damping means.

SUMMARY OF THE INVENTION

An object of the present invention is to provide improved and more efficient soft bearing apparatus.

Another object of the present invention is to provide an improved system for damping a suspended movable body.

A further object of the present invention is to provide a compact, inexpensive and effective system for attenuating vibrations in soft bearing systems.

Still another object of the present invention is to provide magnetic suspension systems utilizing a high magnetic field for eliminating or at least reducing radial and axial vibrations in such systems.

In accordance with the present invention, a high magnetic field is utilized for damping or attenuating vibrations which occur during the rotation of rotors in soft bearing systems, such as magnetic bearings, thereby enabling the rotor to operate at high rotational speeds. According to one embodiment, each end of the soft bearing system is equipped with a powerful permanent magnet capable of producing a strong magnetic field and a conductive member placed in close proximity to the magnet such that during normal rotation a uniform magnetic field is produced causing substantially no damping to occur. However, when radial and/or axial vibration occurs the uniformity of the magnetic field is destroyed and damping proportional to the frequency of vibration causes the vibration to attenuate.

BRIEF DESCRIPTION OF THE DRAWINGS

Other and further objects, advantages and features of the invention will be apparent to those skilled in the art from the following detailed description thereof, taken in conjunction with the accompanying drawings, in which.

DESCRIPTION OF THE PREFERRED EMBODIMENTS

Figure 1:
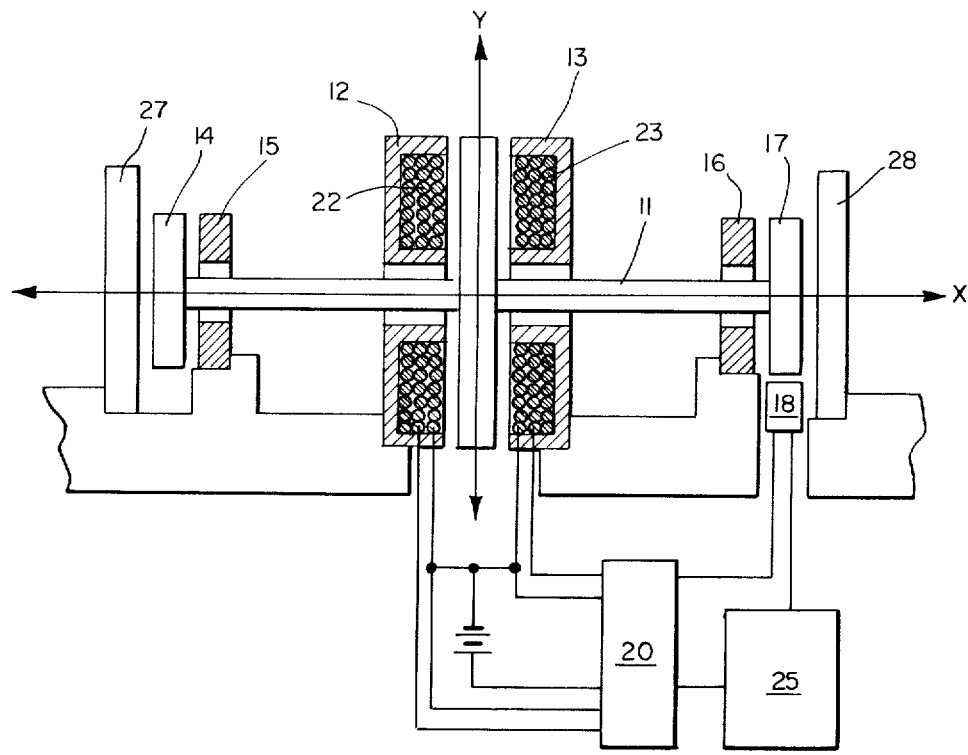
FIG. 1 illustrates in highly schematic form an embodiment in accordance with the present invention employing conductive members located in close proximity to each end of a bearing system.

In accordance with FIG. 1, a rigid body 11, such as a cylinder, is suspended between electromagnets 12 and 13 and permanent magnets 14, 15, 16 and 17. Permanent magnet assemblies 14, 15, 16 and 17 provide radial restoring forces, but contribute to axial instability. Such instability is conventionally corrected by sensor 18, which can be a displacement and/or a rate sensor. As described in more detail in U.S. Pat. No. 3,473,852, which is hereby incorporated by reference, sensor 18 can include any suitable means for sensing movement of the suspended body 11, such as means for obtaining a rate component by means of one or more coils arranged to cooperate with a permanent magnet 17 at the end of suspended body 11. In such an arrangement, movement of the suspended body causes either an increase or a decrease in the magnetic flux linkage with the turns of the coil thereby resulting in an output voltage of a polarity proportional to the rate of movement of the suspended body. A displacement component can be derived from a photoelectric arrangement having a light source, a shield, and a photoelectric cell for sensing the displacement of suspended body 11. The output from sensor 18 (a displacement and/or a rate component), is then amplified and filtered in a processor 20 and used to activate force coils 22 and 23 in electromagnets 12 and 13, respectively. These electromagnets act to dynamically center suspended rigid body 11. By integrating the output from sensor 18 in integrator 25 the steady state driving power supplied to coils 22 and 23 of electromagnets 12 and 13 can be gradually reduced. This is effected by displacing the equilibrium point toward the source of external force. The resultant axial force of the permanent magnets then balances the applied external force.

Considering the aforementioned conventional elements of FIG. 1 in more detail, suspended body 11 is illustrated as figure of revolution about its longitudinal axis, for example, a cylinder. This body can take the form of a gyroscope rotor, or can be vertically arranged as a rotary mass from which a centrifugal chamber is to depend. As with other magnetic suspension apparatus, brushes and magnetic bearings of conventional D.C. motors, with their attendant problems, are eliminated. For imparting high speed rotation to the suspended body 11, a rotating induction field can be produced by a motor (not shown) which surrounds the suspended body. As mentioned above, the contribution of permanent magnets 14, 15, 16 and 17 is unstable. As permanent magnet 14 on suspended body 11 moves toward permanent magnet 15, the force or attraction of permanent magnet 15 increases and the force or attraction of the opposing permanent magnet 16 decreases. Without the electromagnet servo system, suspended body 11 would be a falling body, supported radially to some degree by the fields of the permanent magnets. Stability, as distinguished from the normal sustaining force, is provided by electromagnets 12 and 13.

Each of the electromagnets 12 and 13 comprises two cylindrical permeable members so constructed and arranged as to exert on suspended body a force parallel to the axis thereof when said body is aligned with the axis of the electromagnets, and to exert a force component transverse to the axis of suspended body 11 when it is finally displaced from a position of coincidence with its axis and with the axis of the electromagnets. These electromagnets are energized by direct current, the intensity of energization being differentially controlled.

The outer cylindrical member of electromagnet 12 is composed of permeable material. The electromagnetic coil illustrated in the drawing for electromagnet 12 is a stationary coil winding 22. The electromagnetic coil takes the form of a thin cylindrical shell in which overlapped windings are present in a suitable plastic matrix, such as epoxy. Electromagnet 13 is similarly constructed with a cylindrical permeable member and a stationary coil winding 23.

The electromagnets are used as part of the servo system to maintain suspended body 11 in its zero center position, which is a position lying on a plane cutting through the magnetic center of the field supplied by the permanent magnets. At or in the region immediately adjacent to the aforementioned plane extremely small forces are required to maintain the magnetic "center of gravity" of the suspended body. The servo system senses any axial transitional velocity and acts to reduce this velocity and restore suspended body 11 to its original position.

Since the electromagnets can be regulated, the whole acceleration field can be shifted axially. One manner of accomplishing this is by biasing an amplifier. Thus, if movable body 11 moves toward the permanent magnet 16, and the pull of that magnet is increased, the differential pull of electromagnet 12 is adjusted to increase much more steeply to restore stability of the overall system. Accordingly, the electromagnets can be so regulated to reduce the velocity of movable body 11, stop it altogether, and even reverse the velocity of said body until it is once again coincident with neutral or zero acceleration position. At the neutral or zero acceleration position, the electromagnets are needed only to maintain the position since the permanent magnets carry all static loads. Virtually zero power is required to maintain the movable body in the zero or neutral acceleration position once the movable body has been properly positioned.

Without adjusting the acceleration field, differential pull (net) of the electromagnets minus the differential pull (net) of the permanent magnets would be necessary to equal a steady state force (e.g., such as gravity). By adjusting the entire acceleration field, the electromagnets are relieved of the burden of producing a substantial steady state net force.

It will be seen in FIG. 1 that the equilibrium position of rigid body 11 which is suspended magnetically is inherently off center in the presence of axial acceleration. This reduces the dynamic range of motion in the direction of the displacement of rigid body 11 and causes unequal radial stiffness to be present at permanent magnet assemblies 14, 15, 16 and 17. This fact plus any inherent unbalance present in the system can result in radial vibration during rotation which is not only troublesome but can become dangerous at high rotational speeds.

Although it is true of all "soft" bearings, unbalance in magnetic journal bearings, when no physical contact exists between rotor and stator, can cause large shaft excursions of a vibratory nature. If the oscillations caused by unbalance are sufficiently large during rotation, physical contact can take place, destroying the effectiveness of the bearings. Balancing alone, i.e., the process of eliminating vibrations at the bearings supporting a rotating body by alternating the distribution of mass in the body, has not been sufficient to overcome the problem. The principal causes of unbalance in rotating parts are as follows:

1. unmachined portions of castings or forgings which, because of the process by which they are formed, cannot be made accurately concentric or symmetrical with the axis of rotation, 2. lack of homogeneity throughout the material, whether cast, forged, rolled, formed, extruded, or otherwise produced.

3. asymmetry of a part, brought about by limitations in design or manufacture, 4. asymmetrical distortion of a body while running at its operating speed, 5. variations in the distribution of mass due to manufacturing tolerances allowed on all machined surfaces, 6. minutely bent shafts, which can be produced by pressing a rotor onto a previously finished ground shaft, or by the relief, due to ageing, of any stresses which have been locked in the shaft during machining or heat treatment, and 7. accumulations of tolerances in assemblies of individually balanced components.

Although, as indicated above, permanent magnets 14, 15, 16 and 17 act to provide radial restoring forces, the problem of radial vibration during rotation of rigid body 11 has not been overcome by such magnets alone, initial balancing alone or a combination of both. In FIG. 1, conductive blocks 27 and 28 which preferably are formed from a highly conductive material, such as copper, are placed in close proximity to permanent magnets 14 and 17. Permanent magnets 14 and 17, such as samarium-cobalt type permanent magnets, are suitably selected to produce a very strong magnetic field at each end of suspended body 11. No damping occurs as the rotor turns without vibration since a uniform magnetic field exists at each end of the rotor 11 and there is no change in the flux. However, when rotor 11 starts to move in either the axial or radial direction (X or the Y direction indicated in FIG. 1), its movement is opposed by the magnetic field set up in conductive blocks 27 and 28, in addition to the opposition caused by permanent magnets 15 and 16 to such movement. It will be seen that the amount of damping with respect to permanent magnets 14 and 17 and the corresponding conductive members 27 and 28 is proportional to the frequency of vibration.

In accordance with one specific embodiment, a one quarter inch thick copper plate was employed at one end only of a magnetically suspended rotor system such as that illustrated by FIG. 1. Before adding the copper plate, a small two phase D.C. motor was used to rotate the bearing system to a speed between 1,800 and 2,000 revolutions per minute (rpm). However, at this speed the rotor vibrated so badly that the rotor speed could not be increased. After the copper plate had been added, the identical bearing was rotated through 2,000 revolutions per minute, with very little vibration, reaching 6,400 revolutions per minute in less than ten seconds.

The above test demonstrates the effectiveness of the present invention even when a conductive plate is placed only at one end of the bearing system. For optimum results, conductive plates should be present at both ends of the bearing system. Any suitable conductive material of low resistivity such as copper, silver, gold, aluminum and silicium bronze can be employed for this purpose, but preferably a highly conductive material such as copper is employed. Thus, the most desirable conductive plates are formed from materials which have a resistivity of less than about 3 microhm-centimeters at 20°C. If desired, flux concentrators or designs which will concentrate flux in the conductive plate can be employed. An example of this was the use of a steel washer added to the opposite side of the copper plate utilized in connection with the specific embodiment mentioned above in which a rotor was rotated to a speed of 6,400 revolutions per minute in less than 10 seconds.

As indicated above, the permanent magnets 14 and 17 are selected to provide a strong magnetic field essential for the damping effect of the invention. Conventional Alnico magnets cannot be used since such magnets have such a high permeability that an air gap of less than about 0.005 inches would be required. This small air gap would not permit any axial movement as is commonly found in soft bearings. Generally, the magnet employed has a peak energy product higher than about 7.25 megagauss-oersteds; preferably at least 7.5 megagauss-oersteds. Strong magnetic fields can be produced by samarium cobalt permanent magnets, for example, which are ideal from the standpoint of their size and weight and which have a peak energy product of 20 megagauss-oersteds; and platinum cobalt magnets which have a peak energy product of 7.5 megagauss-oersteds. In addition to a high peak energy product, the magnets should have low permeability (i.e., about 5 or less) and preferably a permeability of less than about 2. Rare-earth magnets in particular exhibit high energy product levels and low permeability. With rare-earth magnets air gaps of about 0.100 inches are practical.

While the present invention has particular applicability to magnetically suspended rotors, the invention can also be used in connection with any "soft" bearing system. For example, soft bearings such as air bearings can be adapted to utilize the present invention simply by adding conductive plates and strong magnetic fields at one or more ends of the bearing system. The desirability of overcoming vibrations and eliminating tricky balancing problems are of course as essential in the case of conventional bearings as in the case of magnetically suspended systems.

From the foregoing, it will be seen that this invention is well adapted to obtain all of the ends and objects hereinabove set forth, together with other advantages which are obvious and which are inherent to the system. Although the present invention has been described in terms of a suspended body maintained in an equilibrium position, by both permanent and electromagnets, it will be understood that the present invention can be used in connection with other types of magnetic suspension systems, including, for example, systems employing adjustable permanent magnets. The damper system of this invention has the advantage of simplicity, the presence of no additional moving parts separate from the rotor, compactness, a damping which is proportional to the frequency of vibration and essentially no power consumption. Moreover, the damping does not inhibit rotation.

It will be understood that the system illustrated in FIG. 1 can be either vertically or horizontally disposed. If the system is operated in the earth's gravitational field, the permanent magnets 14, 15, 16 and 17, in the case of horizontal disposition, are required to exhibit vertical force components. Actually, the improved apparatus of the present invention permits apparatus to be used in a variety of different environments, with various amounts of force due to gravity and/or acceleration. The magnetic suspension system will accommodate relative displacements between the suspending portion and the suspending apparatus, including angular as well as translational components. In addition, the present invention permits a physical object to be suspended in the presence of varying disturbing forces solely through the inherent fields existing in permanent magnets with the expenditure of extremely small and almost nominal, amounts of power needed for control purposes.

If the embodiment of FIG. 1 is modified by adding a magnet to plates 27 and 28 opposite rotor magnets 14 and 17 both radial and axial damping are increased greatly. However, there is also an increase in axial and radial stiffness.

Figure 2:
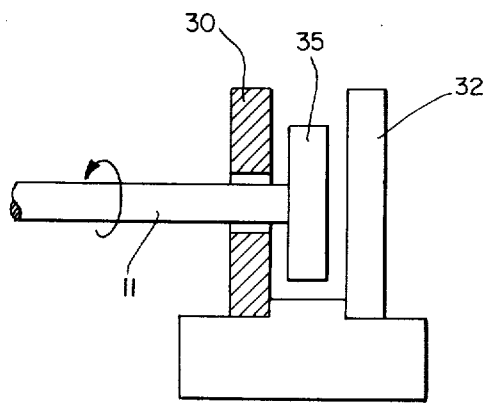
FIGS. 2 and 3 illustrate in highly schematic form separate end portion embodiments in accordance with the present invention.

In FIG. 2 an embodiment of the invention is illustrated in which conductive plates 30 and 32 are disposed on opposite sides of permanent magnet 35. Permanent magnet 35 is, of course, attached to the end of rotor 11.

Figure 3:
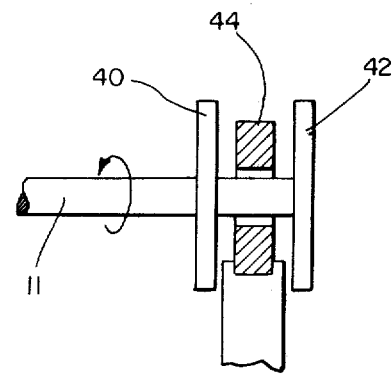

While FIGS. 1 and 2 illustrates embodiments in which the permanent magnet is at or near the end of a rotor in close proximity to one or more conductive blocks which are not attached to the rotor, it should be understood that a less preferred embodiment could be used wherein one or more conductive blocks are mounted on the rotor in close proximity to a permanent magnet which is not attached to the rotor. Such an embodiment is illustrated by FIG. 3 in which conductive plates 40 and 42 are attached to rotor 11 and permanent magnet 44 is located in proximity to plates 40 and 42. This embodiment of FIG. 3 cannot be used for radial and axial damping, however, unless rotary damping can be tolerated.

Although from the standpoint of simplicity and cost a permanent magnet is shown for producing a strong magnetic field in the presence of a conductive plate, it will be understood that if desired electromagnets could be used in place of the permanent magnets.

Obviously, many other modifications and variations of the invention as hereinbefore set forth can be made without departing from the spirit and scope thereof.

What is claimed is:

1. Damping apparatus for magnetic bearing systems, which apparatus comprises:
   a magnetically suspended movable object;
   means for rotating said movable object;
   means for obtaining radial and axial damping of said movable object, each damping means comprising a conductive plate which has a resistivity of less than about 3 microhm-centimeters at 20°C, and a magnet which has a peak energy product of at least about 7.25 megagauss-oersteds and a permeability of less than 5; and
   magnet means for maintaining the movable object in an equilibrium position, which magnet means is different from the damping means.

2. Damping apparatus for magnetic bearing systems, which apparatus comprises:
   a magnetically suspended movable object;
   means for rotating said movable object; and
   means for obtaining radial and axial damping of said movable object, each damping means comprising a magnet attached to the movable object,
   said magnet having a peak energy product of at least about 7.25 megagauss-oersteds and a permeability of less than 5, and a conductive plate located in close proximity to each said magnet, said conductive plate having a resistivity of less than about 3 microhm-centimeters at 20°C.

* * * * *